Nov. 28, 1944.  J. HOLLAND-LETZ  2,363,589
GRAIN BLOWER ATTACHMENT
Filed June 25, 1943
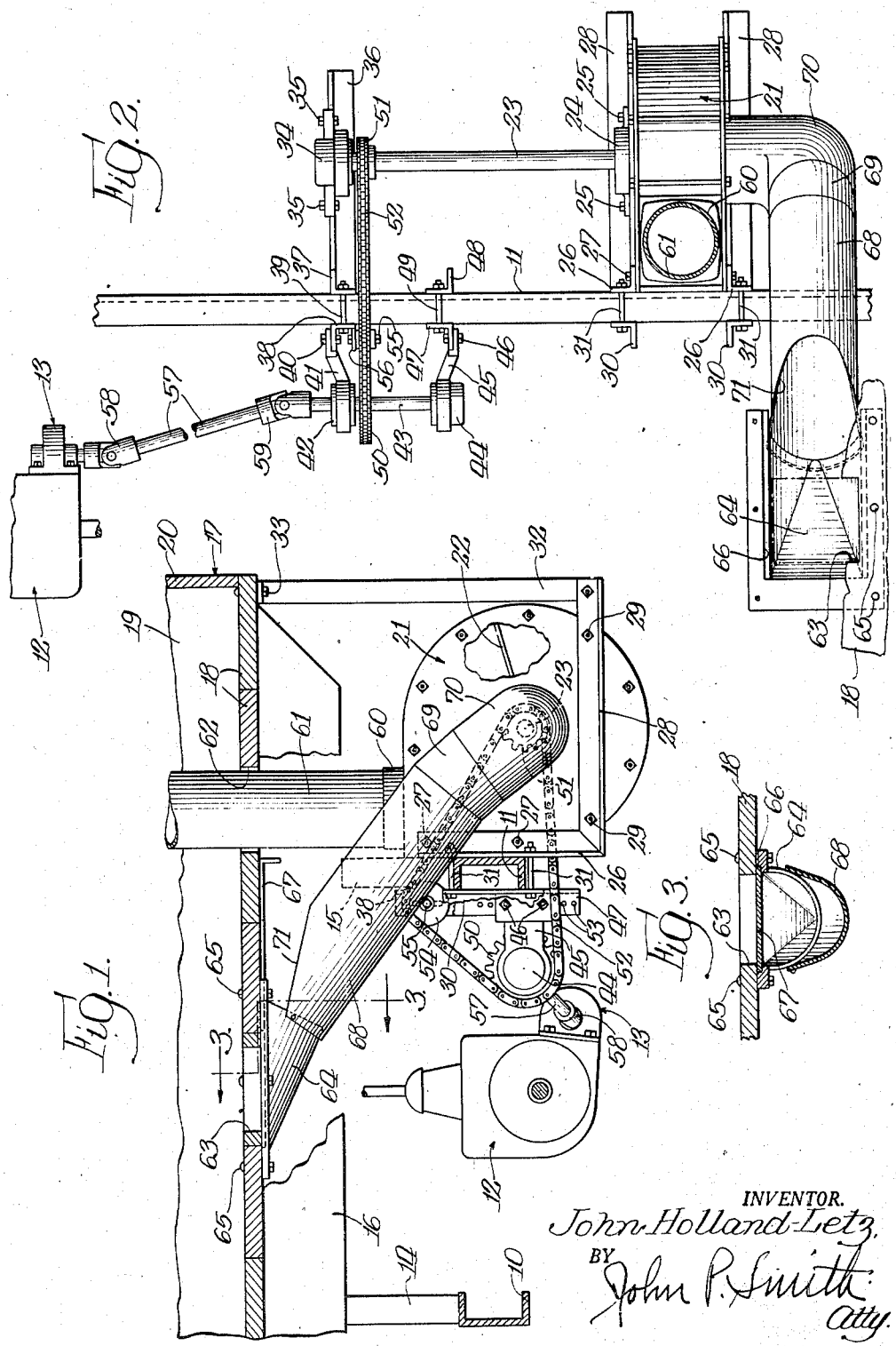
INVENTOR.
John Holland-Letz,
BY John P. Smith
Atty.

Patented Nov. 28, 1944

2,363,589

UNITED STATES PATENT OFFICE 2,363,589

GRAIN BLOWER ATTACHMENT

John Holland-Letz, Crown Point, Ind., assignor to The Letz Manufacturing Company, a corporation of Indiana Application June 25, 1943, Serial No. 492,327

6 Claims. (Cl. 214—83)

The present invention relates to a grain blower or elevator attachment of an automotive truck which is adapted to be mounted on and supported by the chassis thereof and operatively driven by a power take-off mechanism associated with the transmission and engine of the truck.

Another object of the invention is to provide a novel and compact type of universal grain blower or elevator attachment for a truck which is adapted to be supported on the chassis thereof below the box frame of the truck so as to withdraw the grain therefrom and elevate or blow the same in elevated bins, box cars or similar storage places.

A still further object of the invention is to provide a novel and improved and simplified construction of a grain blower or elevator attachment for unloading grain or similar materials from trucks to storage bins or the like so as to reduce to a minimum the amount of labor and time heretofore consumed for performing this function or operation.

A further object of the invention is to provide a simple, compact and universal type of unloading means for unloading a truck and the like in which the power for operating the device is derived from the power take-off of the truck.

A yet further object of the invention is to provide a grain blower or elevator for an automotive truck in which the blower is located below the box of the truck and the delivery conduit extends through the floor of the box, confining the whole mechanism within the outer boundaries of the box.

These and other objects are accomplished by providing a construction and an arrangement of the various parts in the manner hereinafter described and particularly pointed out in the appended claims.

Referring to the drawing:

Fig. 1 is a fragmentary and transverse vertical cross section of a portion of an automotive truck showing a portion of the chassis and truck frame or box structure thereof;

Fig. 2 is a fragmentary top plan view of the same showing the manner in which my improved grain blower elevator is clamped to and supported on one of the channel frame members of the chassis of the truck, and also showing the power take-off mechanism and the manner in which it is connected to the transmission mechanism of the truck; and Fig. 3 is a cross sectional view taken on the line 3—3 in Fig. 1.

In illustrating one form of my invention I have shown the same in connection with a conventional form of automotive truck, only a fragmentary portion of which is shown in the drawings. This automotive truck comprises the usual chassis which usually includes two longitudinally extending frame or channel beams 10 and 11. Mounted on the forward end and supported by the chassis frame members 10 and 11 in a manner well understood in the art is an internal combustion engine (not shown). Located rearwardly of the engine is the usual transmission mechanism mounted within the casing 12. Secured to the transmission casing and operatively connected to the gearing mechanism therein is a power take-off mechanism generally indicated by the reference character 13. This power take-off mechanism 13 is usually furnished with automotive trucks for supplying auxiliary power for driving supplemental devices. Mounted on and secured to the longitudinal members 10 and 11 of the chassis are beams or members 14 and 15. Secured to the members 14 and 15 are transverse beams 16 which are uniformly spaced apart throughout the length of the truck frame. Mounted on these beams is a truck box generally indicated by the reference character 17. This truck box comprises or is made up of longitudinally extending planks 18 which form the bottom of the box and vertically extending front and side walls 19 and 20 respectively. The automotive truck thus far described constitutes a conventional form of truck usually employed for the transporting of grain and similar materials and per se forms no part of the present invention except in combination with my blower attachment hereinafter described.

My improved material or grain blower or elevator attachment is preferably mounted below and within the outer boundaries of the box 17 of the automotive truck. The blower is supported or clamped to one of the chassis or channel members 11. The blower in this instance comprises a fan housing 21 in which is mounted a fan 22. The fan 22 is secured to the rear end of a shaft 23. The shaft 23 has a rear portion journaled in a bearing 24 which in turn, is secured to one side of the fan housing by bolts 25. The fan housing is clamped to or supported by chassis frame member 11 through the medium of oppositely disposed and spaced apart angle brackets 26 which have their vertical legs bolted to the front and rear walls of the fan housing 21 by bolts 27. The horizontal legs of the brackets as shown at 28, are secured to the front and rear walls respectively of the fan housing by bolts 29. The angle brackets 26, together with the fan housing is secured to the chassis member 11 by clamp brackets or angles 30 and bolts 31. The outer ends of each of the horizontal legs 28 of the angle brackets are supported by means of steel straps 32 which have their upper ends bent at right angles and secured to the bottom side of the outer board of the box 17 by means of bolts 33. The forward end of the fan shaft 23 is journaled in a bearing 34, which in turn, is secured by means of bolts 35 to a horizontal leg 36 of a right angularly bent angle bracket 37. The angle bracket 37 is clamped to the chassis member 11 by means of a clamp bracket 38 and bolts 39. Secured to the clamp bracket 38, by means of bolts 40, is a bearing arm 41, which in turn, supports a bearing 42. The bearing 42 supports one end of a stub shaft 43. The other end of the stub shaft 43 is supported in a bearing 44, which in turn, is supported by a second bearing bracket 45. The bearing bracket 45 is secured, by means of bolts 46, to a clamp or angle bracket 47. The bracket 47 is clamped to the chassis 11 by means of a second clamp bracket 48 and bolts 49. Secured to the shaft 43 is a sprocket wheel 50. Located in transverse alignment with the sprocket wheel 50 and secured adjacent the forward end of the main shaft 23 is a second sprocket wheel 51. The sprocket wheel 50 is geared to the sprocket wheel 51 by a drive chain 52. The clamping bracket 38 and 47 are provided with a series of spaced apart apertures as shown at 53 so that the bearing brackets 41 and 45 may be adjusted vertically for properly aligning the stub shaft 43 and for clearing the lower lap of the drive chain 42 with respect to the chassis frame member 11. The upper lap of the chain 42 is trained about an idler or chain tightner in the form of a roller 54 journaled on a stud 55 carried by a bracket 56. The bracket 56 is secured to a clamp bracket 38 in any well known manner. Obviously the idler or roller tightner may be vertically adjusted for tightning the chain and for giving proper clearance of the upper lap of the chain with respect to the chassis member 11. The stub shaft 43 is operatively driven from the power take-off mechanism 13 by a tumbling shaft 57 and universal connections 58 and 59. Extending upwardly and arranged tangentially to the curvature of the fan housing 21 is a collar 60 forming the discharge outlet from the fan housing. Secured to the outlet collar 60 is a discharge pipe or conduit 61 which extends vertically upward to a circular opening 62 in the floor of the bottom 18 of the box 17 of the truck. The upper end of this pipe or conduit may be connected in the manner well understood in the art with extensions and elbows as well as a delivery spout so that the material being blown or elevated by the fan can be discharged in an adjacent bin, box car or storage place.

The material such as grain to be unloaded from the box of an automotive truck is discharged through a square opening 63 which is located in the approximate center of the bottom of the truck box. Located below so as to receive the grain from the truck box 17 and surrounding the opening 63 therein is an inclined receiving chute 64 which is secured in position to the bottom of the box by means of bolts 65. Opposite longitudinal recesses 66 are provided adjacent the underside of the floor boards 18 in the chute 64 for slidably receiving a closing door or slide 67 for the purpose of completely shutting off the discharge of grain through the opening. The receiving chute 64 is connected by a pipe or conduit 68. The lower end of the pipe 68 is connected by an intermediate section 69 and an elbow 70 to the axial center of one side of the fan housing as clearly shown in Figs. 1 and 2 of the drawings, for conveying the material, such as grain, from the truck box to the fan housing from where it is elevated by the fan 22 out the discharge conduit 61 to a bin, box car or other place of storage. In this connection it will be observed that the conduit or pipe 67 is provided with an air opening as shown at 71 so as to permit the entrance of air with the grain as it travels down the conduit 68 to the fan housing. This feature is essential in the efficient operation of the blower or elevator and reduces to a minimum the splitting or breaking of the wheat or grain during the elevating operation.

From the above description it will be readily seen that I have provided not only a simple and compact grain blower elevator for unloading an automotive truck, but that by reason of its construction and manner of mounting the same is universal and is adapted to fit all manner and types of automotive trucks where the unloading of materials can be accomplished by this type of blower. With this arrangement, it will be obvious that when the transmission mechanism of the truck is operatively connected up with the power take-off mechanism, the tumbling shaft will be driven to thereby drive the blower fan 22 through the sprocket wheels 50 and 51, drive chains 52. With the mechanism operating thusly, the grain or material will be drawn or discharged from the chute 64 into the conduit 68 where it will be conveyed in the fan housing and discharged by the blower up the conduit 61 into the storage bin, box car, or storage place. The time consumed for unloading a truck will not be in excess of from ten to fifteen minutes, thereby saving time and labor over the manual means heretofore used for accomplishing this particular job.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. In combination with an automotive truck having a material container supported thereon, and a power take-off mechanism associated therewith, a material elevator blower supported on said truck communicating with said container and operatively driven by said power take-off mechanism for unloading the material from said truck, and a discharge conduit connected with said blower, said conduit and blower located within the outer boundaries of said container.

2. In combination with automotive truck having a material container supported thereon and a power take-off mechanism associated therewith, a material elevating blower supported on said truck and operatively driven by said power take-off mechanism, a receiving conduit extending from the bottom of said container to said blower, and a discharging conduit extending from said blower through the floor of said container.

3. In combination with an automotive truck having a material container supported thereon and a power take-off mechanism associated therewith, a material elevating blower supported on said truck and operatively driven by said power take-off mechanism, there being an opening in the bottom of said container, a conduit connected from said opening to said blower for conveying the material thereto, and a discharge conduit extending from said blower through said container for discharging the material therefrom.

4. In combination with an automotive truck having a chassis, a container mounted on said chassis, a power take-off mechanism, and a material elevating blower supported on said chassis and operatively driven by said power take-off mechanism, said blower being positioned below and within the outer boundaries of said container.

5. In combination with an automotive truck having a frame in the form of two longitudinally extending channel members, a box supported on said frame, a power take-off mechanism associated with said truck, an elevating blower clamped to one of said channel members and operatively connected to said power take-off mechanism, said blower including a fan and fan housing, a conduit connecting said box with said fan housing, and a discharge conduit connected with the periphery of said fan housing and extending through the floor of said box for unloading material from said truck.

6. In combination with an automotive truck having a frame in the form of two longitudinally extending channel members, a box supported on said frame, a power take-off mechanism associated with said truck an elevating blower clamped to one of said channel members and operatively connected to said power take-off mechanism, said blower including a fan and fan housing, a conduit connecting said box with said fan housing, there being an air inlet in said conduit adjacent the upper end thereof, and a vertically extending discharge conduit connected with said housing and extending through an aperture in the floor of said box for confining said blower within the boundaries of said box.

JOHN HOLLAND-LETZ.